United States Patent
Acharya et al.

(10) Patent No.: US 6,956,903 B2
(45) Date of Patent: Oct. 18, 2005

(54) METHOD AND APPARATUS FOR THREE-DIMENSIONAL WAVELET TRANSFORM

(75) Inventors: Tinku Acharya, Chandler, AZ (US); Prabir K. Biswas, Kharagpur (IN); Kokku Raghu, Kharagpur (IN)

(73) Assignee: Intel Corporation, Santa Clara, CA (US)

( * ) Notice: Subject to any disclaimer, the term of this patent is extended or adjusted under 35 U.S.C. 154(b) by 523 days.

(21) Appl. No.: 09/867,784

(22) Filed: May 29, 2001

(65) Prior Publication Data

US 2002/0181593 A1 Dec. 5, 2002

(51) Int. Cl.[7] .................................................. H04N 7/12
(52) U.S. Cl. .................................................. 375/240.19
(58) Field of Search ............................... 348/398, 390, 348/415; 375/240.19, 240.18; 382/240, 56, 49, 248

(56) References Cited

U.S. PATENT DOCUMENTS

| | | | |
|---|---|---|---|
| 5,321,776 A | * 6/1994 | Shapiro ..................... 382/240 |
| 5,481,308 A | 1/1996 | Hartung et al. |
| 5,563,960 A | 10/1996 | Shapiro |
| 5,710,835 A | 1/1998 | Bradley |
| 5,748,786 A | 5/1998 | Zandi et al. |
| 5,777,678 A | 7/1998 | Ogata et al. |
| 6,084,912 A | 7/2000 | Reitmeier et al. |
| 6,125,201 A | 9/2000 | Zador |
| 6,144,773 A | 11/2000 | Kolarov et al. |
| 6,157,746 A | 12/2000 | Sodagar et al. |
| 6,222,941 B1 | 4/2001 | Zandi et al. |
| 6,236,758 B1 | 5/2001 | Sodagar et al. |
| 6,269,192 B1 | 7/2001 | Sodagar et al. |
| 6,298,163 B1 | 10/2001 | Sodagar et al. |
| 6,359,928 B1 | 3/2002 | Wang et al. |
| 6,381,280 B1 | * 4/2002 | Lynch et al. ........... 375/240.19 |
| 6,549,666 B1 | * 4/2003 | Schwartz ..................... 382/233 |
| 6,587,589 B1 | 7/2003 | Chen et al. |
| 6,640,015 B1 | * 10/2003 | Lafruit et al. ............... 382/260 |
| 2003/0108247 A1 | * 6/2003 | Acharya et al. ............ 382/240 |

FOREIGN PATENT DOCUMENTS

| | | |
|---|---|---|
| EP | 0 892 557 A1 | 1/1999 |
| EP | 0 905 978 A2 | 3/1999 |
| EP | 0 920 213 A2 | 6/1999 |
| EP | 0 926 896 A2 | 6/1999 |
| WO | WO 93/17524 | 9/1993 |

OTHER PUBLICATIONS

Michael Weeks and Magdy A. Bayoumi, 3–D Discrete Wavelet transform Architectures, 1998, IEEE, 57–60.*

(Continued)

Primary Examiner—Chris Kelley
Assistant Examiner—Behrooz Senfi
(74) Attorney, Agent, or Firm—Sharon Wong

(57) ABSTRACT

Embodiments of a three-dimensional wavelet transform are described. An inverse three-dimensional discrete wavelet transformation (IDWT) is applied to a plurality of transformed video image sub-blocks. The sub-blocks of transformed video images are inverse transformed by applying a bit-based conditional decoding to the embedded zero tree encoded DWT coefficients of the block to obtain a DWT coefficient matrix, up-sampling respective sub-blocks of the DWT coefficient matrix by row, column and frame, filtering and combining one or more respective pairs of up-sampled sub-blocks to produce an up-sampled sub-block corresponding to each respective pair, reapplying the filtering and combining step to any produced up-sampled sub-block pairs until one up-sampled sub-block remains and multiplying the one remaining up-sampled sub-block by eight to produce a block at the next higher resolution.

17 Claims, 5 Drawing Sheets

OTHER PUBLICATIONS

U.S. patent application Ser. No. 09/723,123, filed Nov. 27, 2000, Tinku Acharya, et al.

U.S. patent application Ser. No. 09/390,255, filed Sep. 3, 1999, Tinku Acharya, et al.

"Embedded Image Coding Using Zerotrees of Wavelet Coefficients" IEEE Transactions on Signal Processing, vol. 41, No. 12, pp 3445–3459, Dec. 1993.

Weeks, et al., "3–D Discrete Wavelet Transform Architectures", University of Southwestern Louisiana, Lafayette, LA, 1998 IEEE, pp. 57–60.

Goh, et al., "New 3–D Wavelet Transform Coding Algorithm for Image Sequences", Electronics Letters, Feb. 18, 1993, vol. 29, No. 4, pp. 401–402.

Said, et al., "A New, Fast, and Efficient Image Codec Based on Set Partitioning in Hierarchical Trees", XP 000592420.

IEEE Transactions on Circuits and Systems for Video Technology, vol. 6, No. 3., Jun. 1996, pp. 243–250.

Mounir Hamdi, "Parallel Architectures for Wavelet Transforms", Jan. 1993 (pp. 376–384–see pp. 376–383).

PCT International Preliminary Examination Report, dated Jul. 2, 2004–International Application No. PCT/US02/16378–International Filing Date May 23, 2002 (5 pgs.).

PCT Written Opinion, dated Jun. 3, 2004–International Application No. PCT/US02/16378–International Filing Date May 23, 2002 (5 pgs.).

* cited by examiner

Table: Performance of the proposed Algorithm on the video sequences - Miss America (moderate motion) and Car (high motion).

|  | Performance without quantization | | Performance with quantization | |
|---|---|---|---|---|
|  | Compression Ratio | PSNR | Compression Ratio | PSNR |
| Miss America | 25.92 | 40.82 | — | — |
|  | 48.80 | 37.68 | 87.60 | 36.42 |
|  | 116.34 | 33.92 | 243.27 | 32.46 |
| Car | 4.21 | 36.28 | 27.24 | 31.08 |
|  | 12.08 | 30.53 | 64.13 | 28.01 |

FIG. 5

METHOD AND APPARATUS FOR THREE-DIMENSIONAL WAVELET TRANSFORM

RELATED APPLICATIONS

This patent application is related to U.S. patent application Ser. No. 09/390,255, titled "Zerotree Encoding of Wavelet Data," filed Sep. 3, 1999, by Acharya et al.; U.S. patent application Ser. No. 09/723,123, titled "Encoding of Wavelet Transformed Error Data," filed Nov. 27, 2000, by Acharya et al.; and concurrently filed U.S. patent application Ser. No. 09/867,781, titled "Method and Apparatus for Coding of Wavelet Transformed Coefficients," filed May 29, 2001, by Acharya et al.; all of the foregoing assigned to the assignee of the presently claimed subject matter. Concurrently filed U.S. patent application Ser. No. 09/867,781, titled "Method and Apparatus for Coding of Wavelet Transformed Coefficients," filed May 29, 2001, by Acharya et al. is herein incorporated by reference.

BACKGROUND

This disclosure is related to three dimensional (3D) image and/or video transforms.

3D subband coding, an extension of 2D subband coding, has recently received increased attention due, at least in part, to the following reasons. First, it typically produces less blocking artifacts, which is a common problem with alternate coding methods, such as motion compensation (MC) and discrete cosine transform (DCT) approaches, particularly at low bitrates. Second, unlike MC compression methods, it does not employ a separate motion estimation stage. Third, it is scalable, both spatially and temporally. The efficiency of the wavelet based codes lies in the applied coding schemes, such as described in an article by Shapiro "Embedded Image Coding Using Zerotrees of Wavelet Coefficients," IEEE Transactions on Signal Processing, Vol. 41, No. 12, pp. 3445–3459, December 1993, for example, which codes wavelet coefficients efficiently.

Unfortunately, the performance of these techniques may be low when dealing with the wavelet coefficients of low energy content. Furthermore, observation indicates that wavelet coefficients generated by a 3D wavelet transform may be of low energy content. For example, a majority of the wavelet transformed coefficient values may be zero or have a value of small magnitude. The standard method makes several passes to code these frames and, in each of these passes, compares the current threshold value with this low-valued coefficients. This may result in a lower compression ratio and coding efficiency. A need, therefore, exists for an approach that at least roughly maintains coding efficiency and compression ratio.

BRIEF DESCRIPTION OF THE DRAWINGS

Subject matter is particularly pointed out and distinctly claimed in the concluding portion of the specification. The claimed subject matter, however, both as to organization and method of operation, together with objects, features, and aadvantages thereof, may best be understood by reference of the following detailed description when read with the accompanying drawings in which:

FIG. 5 is a table illustrating representative results of applying an embodiment of a method of coding a 3D wavelet transform.

DETAILED DESCRIPTION

In the following detailed description, numerous specific details are set forth in order to provide a thorough understanding of the claimed subject matter. However, it will be understood by those skilled in the art that the claimed subject matter may be practiced without these specific details. In other instances, well-known methods, procedures, components and circuits have not been described in detail in order so as not to obscure the claimed subject matter.

A multi-resolution wavelet representation may provide a simple hierarchical framework for interpreting an image. At different resolutions, the details of an image may generally characterize different physical structures of the scene. A coarse to fine coding approach, for example, may assist in coding of the transformed image by assisting in effective compression. When a similar approach is applied to a video sequence, generating a 3-D transform may be involved. Such a representation may also indicate the different physical structures of the sequence, but, rather than edge information, subblocks may be produced indicating edge movements in time. One embodiment of a procedure to perform a 3-D wavelet transform may be as follows, although, the claimed subject matter is not limited in scope to this particular approach or embodiment. For example, an embodiment of a method of applying a three-dimensional discrete wavelet transformation (DWT) to a plurality of video images may include the following. The plurality of video images may comprise frames, and the frames may comprise rows and columns. In such a method, a plurality of blocks of DWT coefficients may be produced by: respectively and successively filtering along a sequence of frames, a sequence of columns and a sequence of rows of the plurality of video images; after applying each filter operation, subsampling the result of applying the filter operation; and after producing the blocks of DWT coefficients, applying a bit-based conditional coding to embedded zero tree code the DWT coefficients. This is described in more detail below in conjunction with FIG. 2

Figure 1:
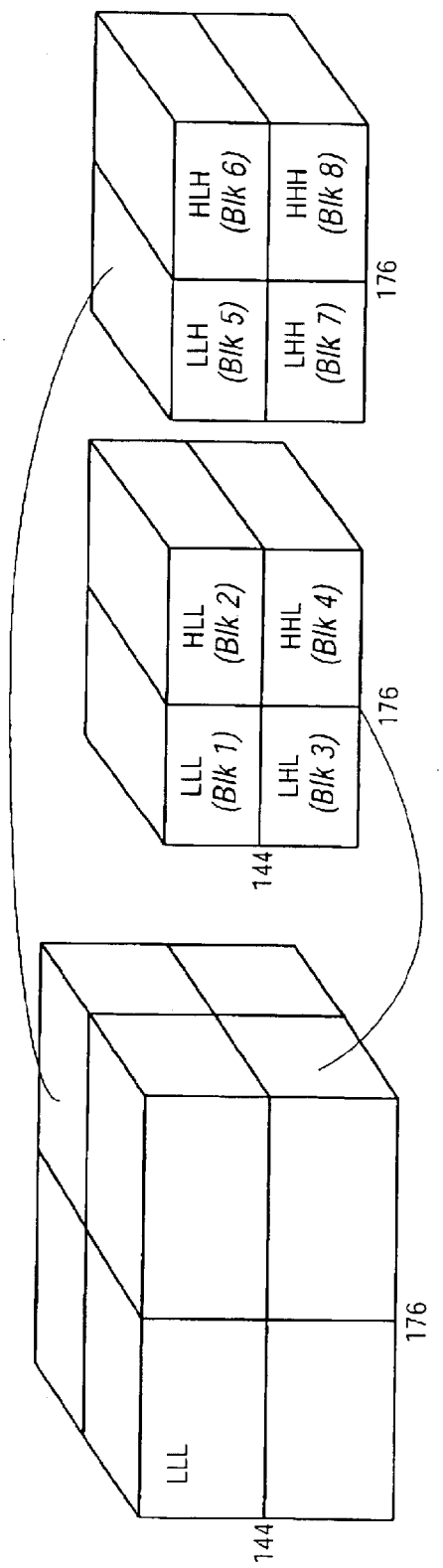
FIG. 1 is a schematic diagram showing one level of a 3D wavelet transform with its sub-blocks.
Figure 2:
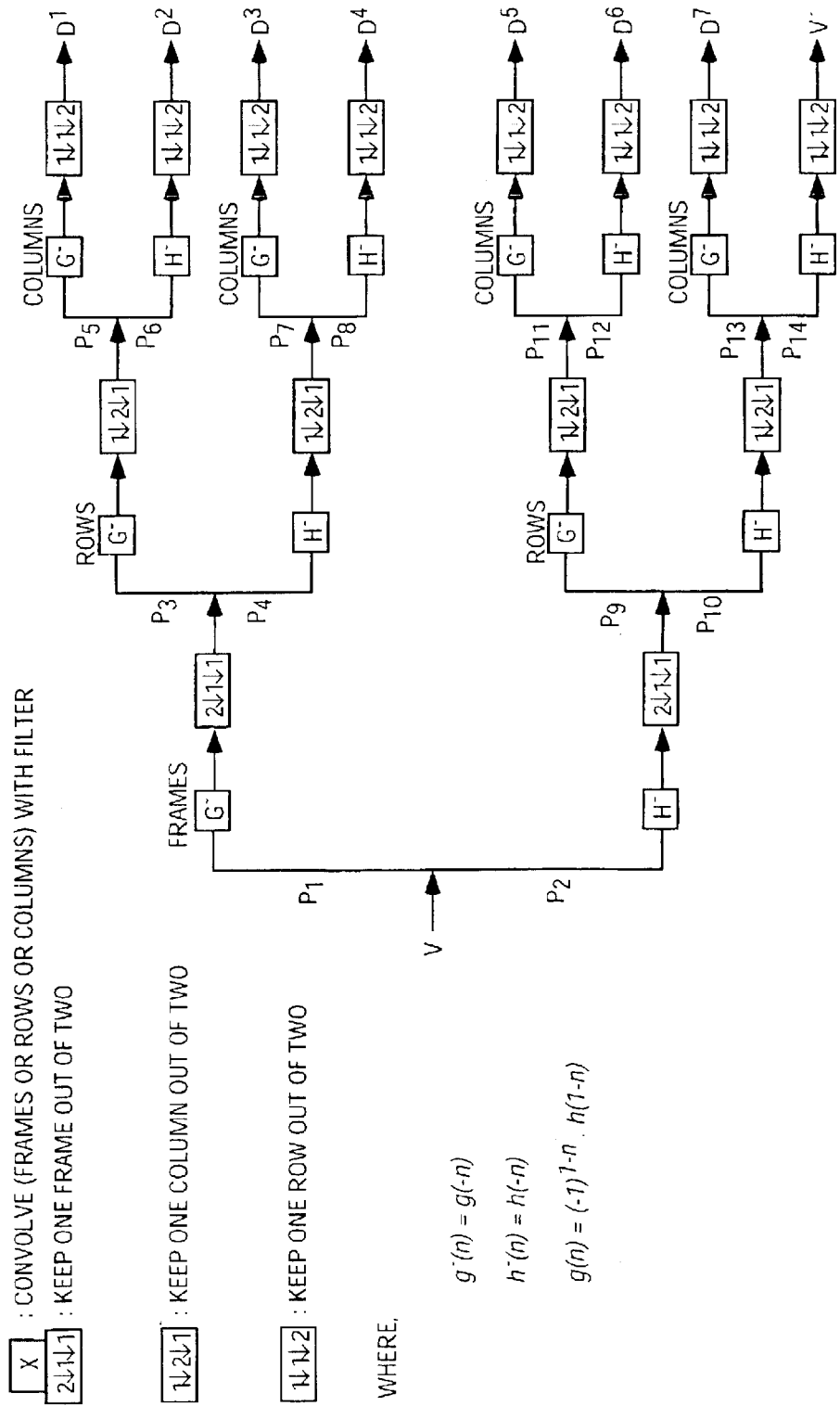
FIG. 2 is a process flow of one embodiment of a method to implement coding a 3D wavelet transform.

The input video sequence, here designated V, may be treated as a 3-D block with the different frames arranged substantially according to time position. This sequence, as illustrated in FIG. 2, in this particular embodiment may be fed to two paths, designated $P_1$ and $P_2$ in FIG. 2. Along one path, here $P_1$, filtering along the time axis may be applied, in this embodiment with filter function g(n). The filtered data, again, in this particular embodiment may be sub-sampled, here by 2. Thus, in this embodiment, alternative frames of the block may be retained. The frames from this reduced block may be again fed into two paths, here $P_3$ and $P_4$, as illustrated in FIG. 2.

Along one of the paths or sub-paths, such as here $P_3$, filtering may be applied along the rows, again with filter function g(n). The filtered data, again, in this particular embodiment may be sub-sampled, here by 2. Here, alternative columns of the matrix or frame may be retained. This reduced matrix may be fed into two paths, $P_5$ and $P_6$ as illustrated in FIG. 2.

Along direction $P_5$, here, filtering may be applied along the columns with filter function g(n). The filtered data may be sub-sampled by 2. Alternative rows of the matrix may be retained. This may produce a detail signal, $D^1$.

Along the other direction, here $P_6$, filtering may be applied along the columns with filter function h(n), in this particular embodiment. The filtered data may be sub-sampled by 2, again, for this particular embodiment. Alternative rows of the matrix may be retained. This may produce a detail signal, $D^2$.

In the other sub-path, here $P_4$, filtering may be applied along the rows with filter function h(n). The filtered data may be sub-sampled by 2. Alternative columns of the matrix may be retained. This reduced matrix may be again split into two paths, $P_7$ and $P_8$ in FIG. 2.

In one direction $P_7$, filtering may be applied along the columns, here with filter function g(n). The filtered data may be sub-sampled by 2. Here, alternative rows of the matrix may be retained. This may produce a detail signal, $D^3$.

In the other direction $P_8$, filtering may be applied along the columns, here with filter function h(n). The filtered data may be sub-sampled by 2. Alternative rows of the matrix may be retained. This may produce a detail signal, $D^4$.

In the other path, here $P_2$, filtering may be applied along the time axis, here with filter function h(n) in this embodiment. The filtered data may be sub-sampled by 2, in this embodiment. Alternative frames of the block may be retained. The frames from this reduced block may be again fed into two paths, $P_9$ and $P_{10}$ in FIG. 2.

In one sub-path $P_9$, filtering may be applied along the rows, with filter function g(n) in this embodiment. The filtered data may be sub-sampled by 2. Thus, alternative columns of the matrix or frame may be retained. This reduced matrix may be again fed into two paths, $P_{11}$ and $P_{12}$ in FIG. 2.

In one direction, here $P_{11}$, filtering may be applied along the columns, here with filter function g(n). The filtered data may be sub-sampled by 2. Thus, alternative rows of the matrix may be retained. This may produce a detail signal, $D^5$.

In the other direction, here $P_{12}$, filtering may be applied along the columns, here with filter function h(n). The filtered data may be sub-sampled by 2. Thus, alternative rows of the matrix may be retained. This may produce a detail signal, $D^6$.

In the other sub-path $P_{10}$, filtering may be applied along the rows, here using h(n). The filtered data may be sub-sampled by 2. Alternative columns of the matrix may be retained. This reduced matrix may again be split into two paths, $P_{13}$ and $P_{14}$ in this embodiment.

In one direction, here $P_{13}$, filtering may be applied along the columns with filter function g(n). The filtered data may be sub-sampled, here by 2. Alternative rows may be retained. This may produce a detail signal, $D^7$.

In the other direction $P_{14}$, filtering may be applied along the columns with filter function h(n) in this embodiment. The filtered data may be sub-sampled by 2. Therefore, alternative rows of the matrix may be retained. This may produce a detail signal, V'.

Thus, seven detail subblocks may be extracted that provide the variations of the edge information, eg, horizontal, vertical and diagonal, with time. The other, or eighth, subblock or component, in this embodiment, may be the applied video sequence at a lower resolution, due to low pass filtering, such as by h(n) in this embodiment. Applying compression to produce these blocks, such as described in more detail hereinafter, for example, therefore, may produce 3-D coding.

Observation indicates that wavelet coefficients generated by applying such a 3D wavelet transform, for example, may typically be found to be of low energy content. For example, the majority of the wavelet transformed coefficient values are zeros or values of small magnitude. The standard method typically makes several passes to code these frames and compares the current threshold value with low-valued coefficients. This may result in a lower compression ratio and coding efficiency. Thus, improved results may be obtained by applying a scheme or technique to address low energy content coefficients.

Characteristics of the foregoing embodiment of a 3D wavelet transform may include the following. A discrete 3D-Wavelet transform may decompose an image into seven subbands, one low frequency subband (LLL) and seven high frequency subbands (LLH, LHL, LHH, HLL, HLH, HHL, HHH). The LLL subband may include characteristics of the original image and may be further decomposed in multiple levels. In one example application, illustrated in FIG. 4, for example, the decomposition may be applied to the qcif video for up to 4 levels (dimensions 144*176*x, here x being of size 16 or 32, respectively).

Figure 4:
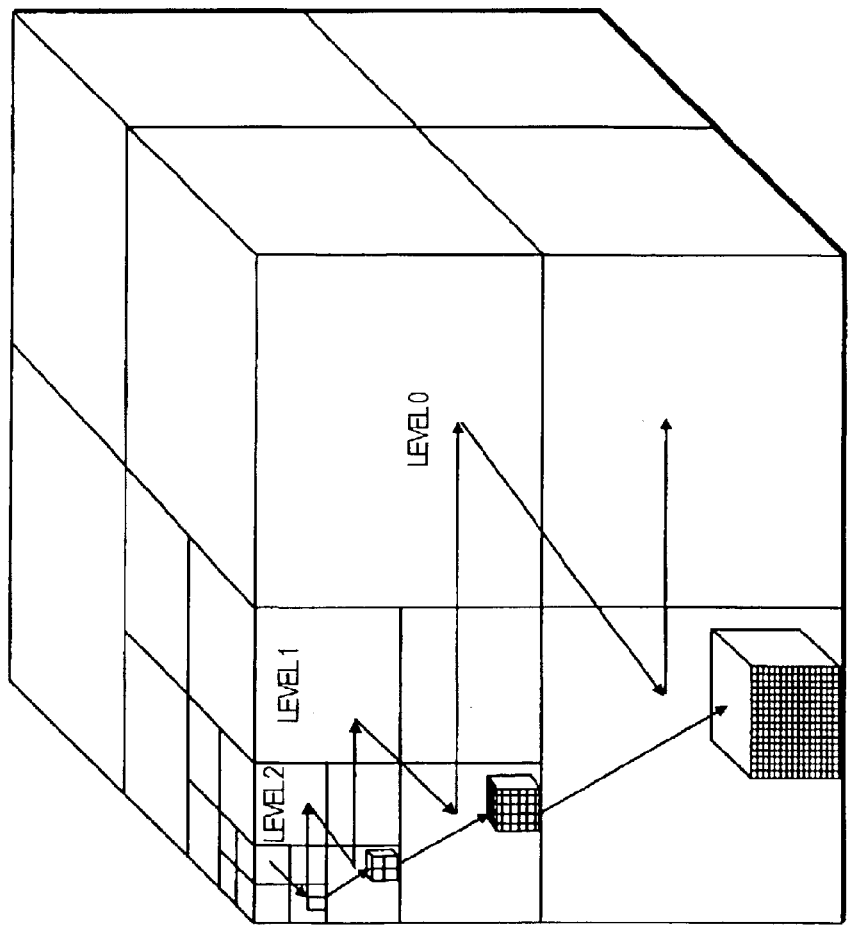
FIG. 4 is a schematic diagram illustrating a parent-child relationship between blocks and sub-blocks for a 3D wavelet transform.

The levels of an example transform are numbered in FIG. 4. The scanning pattern of the coefficients may affect the embedded nature of the transform. The coefficients may be scanned in this particular embodiment in such a way so that no finer level coefficients are scanned before the coarser ones, as indicated in FIG. 4. The parent-child relationship for a zero tree search (ZTR), such as the approach employed in aforementioned concurrently filed patent application Ser. No. 09/867,781, is given below in FIG. 4. Of course, this is just one example and the claimed subject matter is not limited in scope to this particular ZTR or scanning approach. Also in this particular approach, the LLL band is not part of the coding sequence. For example, a lossless coding method may be applied for its transmission. The starting threshold for the coding, in this embodiment, may be taken as 1. In successive passes, the threshold may be increased by a multiplicative factor greater than one, such as two, for example. The total number of such passes may be given as $\lfloor \log_2(\max) \rfloor + 1$, for such an embodiment, where max denotes the maximum value among the magnitudes of the coefficients to be encoded. As in the aforementioned patent application Ser. No. 09/867,781, a bit-based conditional coding scheme may be applied, although, again, the claimed subject matter is not limited in scope in this respect. In such an approach, however, a bit 1 or 0 is coded, depending on particular conditions being true or false, as described in the aforementioned patent application.

For decoding and reconstruction, an inverse procedure may be applied, for this embodiment. The decoder, for example, may start decoding a bit stream generated by an encoder to reconstruction the coefficient matrix. Such a decoding scheme is explained in more detail in the aforementioned patent application Ser. No. 09/867,781, although, again, the claimed subject matter is not limited in scope to this approach. In general, however, some amount of correspondence or association between the approach employed to encode and the approach employed to decode the sequence may typically take place.

Figure 3:
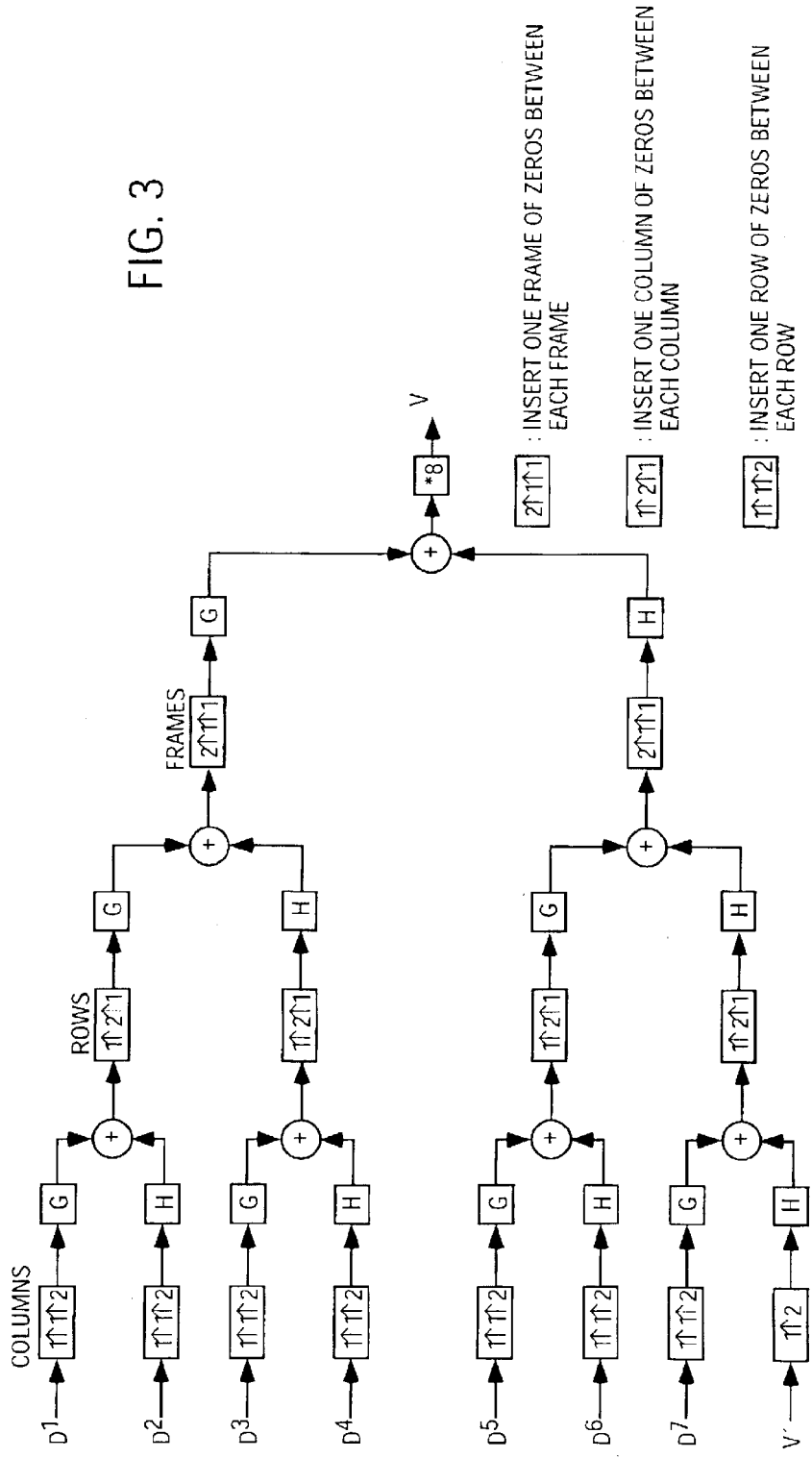
FIG. 3 is a process flow of one embodiment of a method to implement decoding a 3D wavelet transform.

For reconstruction or decoding, a technique or approach as described below and shown in FIG. 3 may be applied. For example, for one particular embodiment, a method of applying an inverse three-dimensional discrete wavelet transformation (3D IDWT) to a plurality of transformed video image sub-blocks, the sub-blocks comprising transformed frames, and the frames comprising rows and columns, may include the following. The transformed video image sub-blocks may be inverse transformed by: up-sampling the respective sub-blocks by row, column and frame; filtering and combining one or more respective pairs of up-sampled sub-blocks to produce an up-sampled sub-block corresponding to each respective pair; reapplying the previous to any produced up-sampled sub-block pairs until one up-sampled sub-block remains; multiplying the one remaining up-sampled sub-block by eight to produce a block at the next higher resolution.

This approach is described is illustrated with reference to FIG. 3 as follows, although, the claimed subject matter is not limited in scope to this particular approach. Detail signal $D^1$ may be up-sampled. For example, a row of zeros may be inserted between adjacent rows. This sub-block may then be filtered along the columns with the filter function g(n). Detail signal $D^2$ may be up-sampled. For example, a row of zeros may be inserted between adjacent rows. This sub-block may then be filtered along the columns with the filter function h(n). The resulting output signals from applying the foregoing processes to $D_1$ and $D_2$ are added, as illustrated in FIG. 3. The resultant sub-block may be up-sampled. For example, a column of zeros may be inserted between adjacent columns. This matrix may then be filtered along the rows with the filter function g(n) to produce interim signals $I_1$.

Detail signal $D^3$ may be up-sampled. For example, a row of zeros may be inserted between rows. This sub-block may then be filtered along the columns with the filter function g(n). Detail signal $D^4$ may be up-sampled. For example, a row of zeros may be inserted between rows. This sub-block may then be filtered along the columns with the filter function h(n). The resultant output signals from applying the foregoing processes to $D_3$ and $D_4$ may be added. The resultant sub-block may ne up-sampled. For example, a column of zeros may be inserted between columns. This matrix may then then filtered along the rows with the filter function h(n). The resultant output signals here may be added with interim signals $I_1$. The resultant sub-block may be up-sampled. For example, a frame of zeros may be inserted between frames. This matrix may be then filtered along the frames with the filter function g(n) to produce interim signals $I_2$.

Detail signal $D^5$ may be up-sampled. For example, a row of zeros may be inserted between adjacent rows. This sub-block may then be filtered along the columns with the filter function g(n). Detail signal $D^6$ may be up-sampled. For example, a row of zeros may be inserted between adjacent rows. This sub-block may then be filtered along the columns with the filter function h(n). The resulting output signals from applying the foregoing processes to $D_5$ and $D_6$ may be added, as illustrated in FIG. 3. The resultant sub-block may be up-sampled. For example, a column of zeros may be inserted between adjacent columns. This matrix may then be filtered along the rows with the filter function g(n) to produce interim signals $I_3$.

Detail signal $D^7$ may be up-sampled. For example, a row of zeros may be inserted between rows. This sub-block may then be filtered along the columns with the filter function g(n). Detail signal V' may be up-sampled. For example, a row of zeros may be inserted between rows. This sub-block may then be filtered along the columns with the filter function h(n). The resultant output signals may be added. The resultant sub-block may be up-sampled. For example, a column of zeros may be inserted between columns. This matrix may then be filtered along the rows with the filter function h(n). The resultant output signals may be added with interim signals $I_3$. The resultant sub-block may be up-sampled. For example, a frame of zeros may be inserted between frames. This matrix may then be filtered along the frames with the filter function h(n). The resultant output signals may be added with interim signals $I_2$. The resultant sub-block may be multiplied by 8 to get the sub-matrix to the next level of resolution.

In effect, for reconstruction, an inverse transform procedure may be applied. For example, in this particular embodiment, a bit-based conditional decoding may be applied, as described in the aforementioned patent application. The detail signals, once available, may be combined with the low-resolution image to get the reconstructed image at a higher resolution.

The particular embodiment previously described has been applied on two popular video sequences: Miss America (moderate motion) and Car sequence (fast motion). The compression performance has been presented in the table in FIG. 5. This table also illustrates that significantly greater compression may be achieved without an appreciable increase in noise.

Although the claimed subject matter is not limited in scope to the particular embodiments described and shown, nonetheless, these embodiments provide a number of potential advantages. An applied 3D wavelet transformation technique has been shown to reduce redundancies in the image sequence by taking advantage of spatial as well as temporal redundancies. No computationally complex motion estimation/compensation technique is employed in this particular embodiment. Likewise, since no motion estimation/compensation based DCT technique is applied, the reconstructed video generally has fewer visually annoying or blocking artifacts. For the most part, the previously described coding scheme is computationally faster and efficiently codes the 3D wavelet transformed coefficients by employing fewer bits. Hence, it improves compression performance. Furthermore, the previously described embodiment may be further modified to achieve greater compression, for example, by dropping initial passes progressively. Furthermore, by applying bit-plane processing, such as described in the aforementioned concurrently filed patent application, with minor modifications to the previously described technique, parallel execution may be employed. Likewise, a bit-plane coding and decoding approach makes such an embodiment of a video coder suitable for a progressive coding environment.

It will, of course, be understood that, although particular embodiments have just been described, the claimed subject matter is not limited in scope to a particular embodiment or implementation. For example, one embodiment may be in hardware, such as implemented to operate on an integrated circuit chip, for example, whereas another embodiment may be in software. Likewise, an embodiment may be in firmware, or any combination of hardware, software, or firmware, for example. Likewise, although the claimed subject matter is not limited in scope in this respect, one embodiment may comprise an article, such as a storage medium. Such a storage medium, such as, for example, a CD-ROM, or a disk, may have stored thereon instructions, which when executed by a system, such as a computer system or platform, or an imaging or video system, for example, may result in an embodiment of a method in accordance with the claimed subject matter being executed, such as an embodiment of a method of video or image processing, for example, as previously described. For example, an image or video processing platform or another processing system may include a video or image processing unit, a video or image input/output device and/or memory.

While certain features of the claimed subject matter have been illustrated and described herein, many modifications, substitutions, changes and equivalents will now occur to those skilled in the art. It is, therefore, to be understood that the appended claims are intended to cover all such modifications and changes as fall within the true spirit of the claimed subject matter.

What is claimed is:

1. A method of applying an inverse three-dimensional discrete wavelet transformation (3D IDWT) to a plurality of transformed video image sub-blocks, said sub-blocks comprising transformed frames, and said frames comprising rows and columns, said method comprising:
   inverse transforming the sub-blocks of transformed video images by:
   (1) applying a bit-based conditional decoding to the embedded zero tree encoded DWT coefficients of the block to obtain a DWT coefficient matrix;
   (2) up-sampling respective sub-blocks of the DWT coefficient matrix by row, column and frame;
   (3) filtering and combining one or more respective pairs of up-sampled sub-blocks to produce an up-sampled sub-block corresponding to each respective pair;
   (4) reapplying (3) to any produced up-sampled sub-block pairs until one up-sampled sub-block remains;
   (5) multiplying the one remaining up-sampled sub-block by eight to produce a block at the next higher resolution.

2. The method of claim 1, wherein the respective sub-blocks of the DWT matrix comprise eight sub-blocks.

3. The method of claim 1, wherein filtering and combining one or more respective pairs of up-sampled sub-blocks comprises applying an inverse low-pass filter to one up-sampled sub-block of the pair and applying a high-pass filter to the other up-sampled sub-block of the pair.

4. The method of claim 1, wherein up-sampling comprises inserting alternate frames, alternate columns and alternate rows.

5. An integrated circuit comprising:
   an architecture to apply an inverse three-dimensional discrete wavelet transformation (3D IDWT) to a plurality of transformed video image sub-blocks, said sub-blocks comprising transformed frames, and said frames comprising rows and columns;
   said architecture adapted to inverse transforming the sub-blocks of transformed video images by:
   (a) applying a bit-based conditional decoding to the embedded zero tree encoded DWT coefficients of the block to obtain a DWT coefficient matrix; (b) up-sampling respective sub-blocks of the DWT coefficient matrix by row, column and frame; (c) filtering and combining one or more respective pairs of up-sampled sub-blocks to produce an up-sampled sub-block corresponding to each respective pair; (d) reapplying (c) to any produced up-sampled sub-block pairs until one up-sampled sub-block remains; and (e) multiplying the one remaining up-sampled sub-block by eight to produce a block at the next higher resolution.

6. The integrated circuit of claim 5, wherein said architecture comprises at least one of the following: hardware, software, firmware, and any combination thereof.

7. The integrated circuit of claim 5, wherein the respective sub-blocks of the DWT coefficient matrix comprise eight sub-blocks.

8. The integrated circuit of claim 5, wherein filtering and combining one or more respective pairs of up-sampled sub-blocks comprises applying an inverse low-pass filter to one up-sampled sub-block of the pair and applying a high-pass filter to the other up-sampled sub-block of the pair.

9. The integrated circuit of claim 5, wherein up-sampling comprises inserting alternate frames, alternate columns and alternate rows.

10. An article comprising: a storage medium having stored thereon instructions, said instructions, when executed by a computing platform, resulting in applying an inverse three-dimensional discrete wavelet transformation (3D IDWT) to a plurality of transformed video image sub-blocks, said sub-blocks comprising transformed frames, and said frames comprising rows and columns, by:
   (1) applying a bit-based conditional decoding to the embedded zero tree encoded DWT coefficients of the block to obtain a DWT coefficient matrix;
   (2) up-sampling respective sub-blocks of the DWT coefficient matrix by row, column and frame;
   (3) filtering and combining one or more respective pairs of up-sampled sub-blocks to produce an up-sampled sub-block corresponding to each respective pair;
   (4) reapplying (3) to any produced up-sampled sub-block pairs until one up-sampled sub-block remains; and
   (5) multiplying the one remaining up-sampled sub-block by eight to produce a block at the next higher resolution.

11. The article of claim 10, wherein the respective sub-blocks of the DWT coefficient matrix comprise eight sub-blocks.

12. The article of claim 10, wherein filtering and combining one or more respective pairs of up-sampled sub-blocks comprises applying an inverse low-pass filter to one up-sampled sub-block of the pair and applying a high-pass filter to the other up-sampled sub-block of the pair.

13. A system comprising:
   an integrated circuit, a memory, and a bus coupling said integrated circuit and memory;
   wherein said integrated circuit comprises an architecture to apply an inverse three-dimensional discrete wavelet transformation (3D IDWT) to a plurality of transformed video image sub-blocks, said sub-blocks comprising transformed frames, and said frames comprising rows and columns;
   said architecture adapted to inverse transforming the sub-blocks of transformed video images by:
   (a) applying a bit-based conditional decoding to the embedded zero tree encoded DWT coefficients of the block to obtain a DWT coefficient matrix; (b) up-sampling respective sub-blocks of the DWT coefficient matrix by row, column and frame; (c) filtering and combining one or more respective pairs of up-sampled sub-blocks to produce an up-sampled sub-block corresponding to each respective pair; (d) reapplying (c) to any produced up-sampled sub-block pairs until one up-sampled sub-block remains; and (e) multiplying the one remaining up-sampled sub-block by eight to produce a block at the next higher resolution.

14. The system of claim 13, wherein said architecture comprises at least one of the following: hardware, software, firmware, and any combination thereof.

15. The system of claim 13, wherein the respective sub-blocks of the DWT coefficient matrix comprise eight sub-blocks.

16. The system of claim 13, wherein filtering and combining one or more respective pairs of up-sampled sub-blocks comprises applying an inverse low-pass filter to one up-sampled sub-block of the pair and applying a high-pass filter to the other up-sampled sub-block of the pair.

17. The system of claim 13, wherein up-sampling comprises inserting alternate frames, alternate columns and alternate rows.

* * * * *